(12) United States Patent
Ogata et al.

(10) Patent No.: US 10,294,068 B2
(45) Date of Patent: May 21, 2019

(54) IMAGE FORMING APPARATUS

(71) Applicant: CANON KABUSHIKI KAISHA, Tokyo (JP)

(72) Inventors: Atsushi Ogata, Mishima (JP); Kazushi Ino, Suntou-gun (JP); Hiroki Kato, Gotemba (JP); Motohiro Furusawa, Shizuoka (JP); Koji Kawamura, Yokohama (JP); Ichiro Yasumaru, Mishima (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/472,507

(22) Filed: Mar. 29, 2017

(65) Prior Publication Data
US 2017/0305711 A1 Oct. 26, 2017

(30) Foreign Application Priority Data
Apr. 21, 2016 (JP) .................. 2016-085610

(51) Int. Cl.
*B65H 85/00* (2006.01)
*B65H 29/12* (2006.01)
(Continued)

(52) U.S. Cl.
CPC ............ *B65H 85/00* (2013.01); *B65H 9/006* (2013.01); *B65H 29/12* (2013.01); *B65H 29/125* (2013.01); *B65H 29/58* (2013.01); *B65H 43/00* (2013.01); *G03G 15/23* (2013.01); *G03G 15/5062* (2013.01); *G03G 15/602* (2013.01); *G03G 15/6529* (2013.01); *G03G 15/6552* (2013.01);
(Continued)

(58) Field of Classification Search
CPC ....................................................... B65H 85/00
USPC ......................................................... 399/405
See application file for complete search history.

(56) References Cited

U.S. PATENT DOCUMENTS 6,302,606 B1 10/2001 Hayakawa et al.
6,318,718 B1 11/2001 Ogata et al.
(Continued)

FOREIGN PATENT DOCUMENTS

JP 2006-232467 A 9/2006
JP 2013-003448 A 1/2013

OTHER PUBLICATIONS

Copending, unpublished, U.S. Appl. No. 15/472,514, to Atsushi Ogata, filed Mar. 29, 2017.

*Primary Examiner* — Anthony H Nguyen
(74) *Attorney, Agent, or Firm* — Venable LLP

(57) ABSTRACT

An image forming apparatus includes a discharging portion to discharge a sheet on which the image has been formed, an image reading portion to read the image formed on the sheet, and a switching portion to switch between a first position where the discharged sheet is conveyed to a supporting portion and a second position where the discharged sheet is conveyed toward the image reading portion. The sheet conveyed toward the image reading portion is conveyed to a reading position after conveyance of the sheet by the discharging portion is finished, and the control portion conveys the sheet at a first conveyance speed in a period before a trailing end of the sheet is released from the discharging portion and conveys the sheet at a second conveyance speed different from the first conveyance speed in a period after the trailing end of the sheet is released from the discharging portion.

7 Claims, 12 Drawing Sheets

(51) Int. Cl.
  *B65H 43/00* (2006.01)
  *G03G 15/00* (2006.01)
  *G03G 15/23* (2006.01)
  *H04N 1/00* (2006.01)
  *B65H 29/58* (2006.01)
  *B65H 9/00* (2006.01)

(52) U.S. Cl.
  CPC ........... *G03G 15/6579* (2013.01); *H04N 1/00* (2013.01); *B65H 2301/33312* (2013.01); *B65H 2404/632* (2013.01); *B65H 2513/108* (2013.01); *B65H 2701/1313* (2013.01); *B65H 2801/06* (2013.01); *B65H 2801/39* (2013.01); *G03G 2215/0094* (2013.01); *G03G 2215/00421* (2013.01); *G03G 2215/00599* (2013.01); *G03G 2215/00675* (2013.01); *G03G 2215/00928* (2013.01); *G03G 2215/00945* (2013.01)

(56) References Cited

U.S. PATENT DOCUMENTS

| | | | |
|---|---|---|---|
| 6,325,371 B1 | 12/2001 | Araki et al. | |
| 6,382,614 B1 | 5/2002 | Fukatsu et al. | |
| 6,690,901 B2 * | 2/2004 | Katsuyama | G03G 15/6552 399/107 |
| 6,725,011 B2 * | 4/2004 | Sato | G03G 15/6552 399/405 |
| 6,731,903 B2 * | 5/2004 | Suzuki | G03G 15/6552 271/279 |
| 6,826,374 B2 | 11/2004 | Kato et al. | |
| 6,973,285 B2 | 12/2005 | Sekiyama et al. | |
| 6,997,449 B2 | 2/2006 | Obuchi et al. | |
| 8,061,712 B2 | 11/2011 | Tsuji et al. | |
| 8,382,109 B2 | 2/2013 | Tsuji et al. | |
| 8,690,150 B2 | 4/2014 | Obara et al. | |
| 8,720,886 B2 | 5/2014 | Kuroda et al. | |
| 8,870,182 B2 | 10/2014 | Ogata et al. | |
| 8,964,271 B2 | 2/2015 | Kaneko et al. | |
| 9,071,712 B2 | 6/2015 | Ino et al. | |
| 9,071,713 B2 | 6/2015 | Ogata et al. | |
| 9,137,403 B2 | 9/2015 | Ogata et al. | |
| 9,203,994 B2 | 12/2015 | Kato et al. | |
| 9,395,672 B2 | 7/2016 | Kaneko et al. | |
| 9,521,282 B2 | 12/2016 | Kato et al. | |
| 2005/0207811 A1 * | 9/2005 | Kimura | G03G 15/6529 399/401 |
| 2009/0086286 A1 * | 4/2009 | Tojo | G03G 15/60 358/488 |
| 2009/0148210 A1 * | 6/2009 | Takenaka | G03G 15/234 399/381 |
| 2009/0325263 A1 * | 12/2009 | Ponaka | C12N 1/04 435/178 |
| 2010/0226678 A1 * | 9/2010 | Sato | B65H 3/44 399/81 |
| 2013/0293909 A1 | 11/2013 | Endo et al. | |
| 2014/0151954 A1 | 6/2014 | Furusawa et al. | |
| 2014/0321897 A1 | 10/2014 | Ogata et al. | |
| 2015/0069694 A1 * | 3/2015 | Taki | B65H 7/20 271/3.19 |
| 2015/0307305 A1 * | 10/2015 | Saito | B65H 43/00 271/3.19 |

* cited by examiner

IMAGE FORMING APPARATUS

BACKGROUND OF THE INVENTION

Field of the Invention

The present invention relates to an image forming apparatus including an image reading portion.

Description of the Related Art

Regarding an image forming apparatus such as a copier or a multifunctional printer, i.e. an MFP, an automatic document feeder, i.e. an ADF, disposed in an upper portion of an image forming apparatus body and an image forming apparatus capable of performing feeding-reading of documents by using the ADF are known. The image forming apparatus body will be hereinafter referred to as an apparatus body. This image forming apparatus is configured such that image formation processing on a sheet serving as a recording medium and image reading processing from a sheet of a document are both realized. Such an image forming apparatus including an image reading portion typically includes an exclusive conveyance path for a recording medium in an image forming portion and an exclusive conveyance path for a document in the image reading portion, and is configured such that the document and the recording medium cannot get into the conveyance path of one another.

Regarding this, Japanese Patent Laid-Open No. 2006-232467 proposes an image forming apparatus including an image reading unit in a duplex conveyance path in an apparatus body such that a conveyance path for a recording medium is shared as a conveyance path for a document.

In addition, Japanese Patent Laid-Open No. 2013-3448 proposes an image forming apparatus that employs a configuration in which a feed portion and a discharging portion are shared for a recording medium and a document, and the recording medium on which an image has been formed is discharged after passing through an image reading portion. This image forming apparatus includes a common path that is shared as a part of a conveyance path for a recording medium and a part of a conveyance path for a document, and thus is capable of reading an image on the recording medium by sending the recording medium on which the image has been printed by an image forming portion to the image reading portion. According to this, it is possible to check whether image formation processing has been properly performed by the image forming portion and to store a printed image formed on the recording medium as new image information.

The image can be read by providing an image reading portion such that a sheet can be conveyed from an image forming portion to the image reading portion and from the image reading portion to the image forming portion as in a conventional technique. However, some positions at which the image reading portion is disposed require setting a conveyance speed of a sheet in the image reading portion in accordance with an image formation condition of the image forming portion. In the case where the speed of the recording medium changes, for example, as a result of the conveyance speed changing due to thermal expansion of a fixing roller or being intentionally changed due to speed control, the speed of the recording medium during image reading becomes unstable. This may lower the precision of image reading.

SUMMARY OF THE INVENTION

According to a first aspect of the invention, an image forming apparatus includes an image forming unit, a discharging portion, a supporting portion, an image reading portion, and a switching portion. The image forming unit is configured to form an image on a sheet. The discharging portion is configured to discharge the sheet on which the image has been formed to an outside of the image forming apparatus. The supporting portion is configured to support the sheet discharged by the discharging portion. The image reading portion is configured to read, at a reading position, the image formed on the sheet. The switching portion is configured to switch between a first position to cause the sheet discharged by the discharging portion to be conveyed to the supporting portion and a second position to cause the sheet discharged by the discharging portion to be conveyed toward the image reading portion configured to read the image. The sheet conveyed toward the image reading portion due to the switching portion is conveyed to the reading position after conveyance of the sheet by the discharging portion is finished.

According to a second aspect of the invention, an image forming apparatus includes an image forming unit, a first sheet conveyance path, an image reading portion, a second sheet conveyance path, a bypassing path, and a sending roller. The image forming unit is configured to form an image on a sheet. The first sheet conveyance path is configured to guide the sheet on which the image is to be formed by the image forming unit. The image reading portion is configured to read the image formed on the sheet. The second sheet conveyance path is configured to guide the sheet whose image is to be read by the image reading portion. The bypassing path serves as a bypass between the first sheet conveyance path and the second sheet conveyance path. The sending roller is disposed in the first sheet conveyance path and is configured to send the sheet on which the image has been formed by the image forming unit into the second sheet conveyance path through the bypassing path. The image formed on the sheet to be sent into the second sheet conveyance path by the sending roller is read by the image reading portion after a trailing end of the sheet is released from the sending roller.

According to a third aspect of the invention, an image forming apparatus includes an image forming unit, a first sheet conveyance path, an image reading portion, a second sheet conveyance path, a sending roller, a receiving roller, and a control portion. The image forming unit is configured to form an image on a sheet. The first sheet conveyance path is configured to guide the sheet on which the image is to be formed by the image forming unit. The image reading portion is configured to read the image formed on the sheet. The second sheet conveyance path is configured to guide the sheet whose image is to be read by the image reading portion. The sending roller is disposed in the first sheet conveyance path and configured to send the sheet on which the image has been formed by the image forming unit into the second sheet conveyance path. The receiving roller is disposed in the second sheet conveyance path and configured to receive the sheet conveyed by the sending roller. The control portion is configured to control the receiving roller such that the sheet conveyed by the sending roller is inverted and conveyed to the image reading portion.

Further features of the present invention will become apparent from the following description of exemplary embodiments with reference to the attached drawings.

BRIEF DESCRIPTION OF THE DRAWINGS

FIG. 1 is a schematic section view of an image forming apparatus including an image reading portion according to a first exemplary embodiment of the present invention.

DESCRIPTION OF THE EMBODIMENTS

First Exemplary Embodiment

Figure 1:
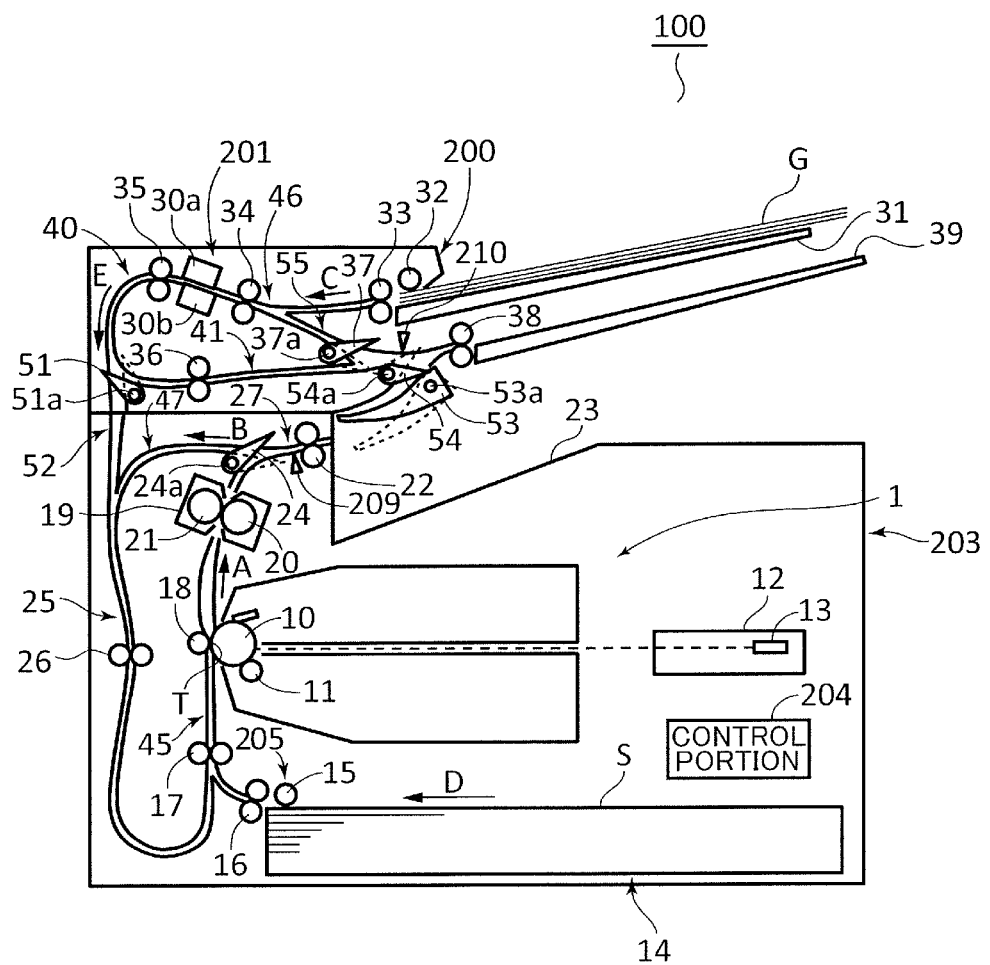
Figure 2:
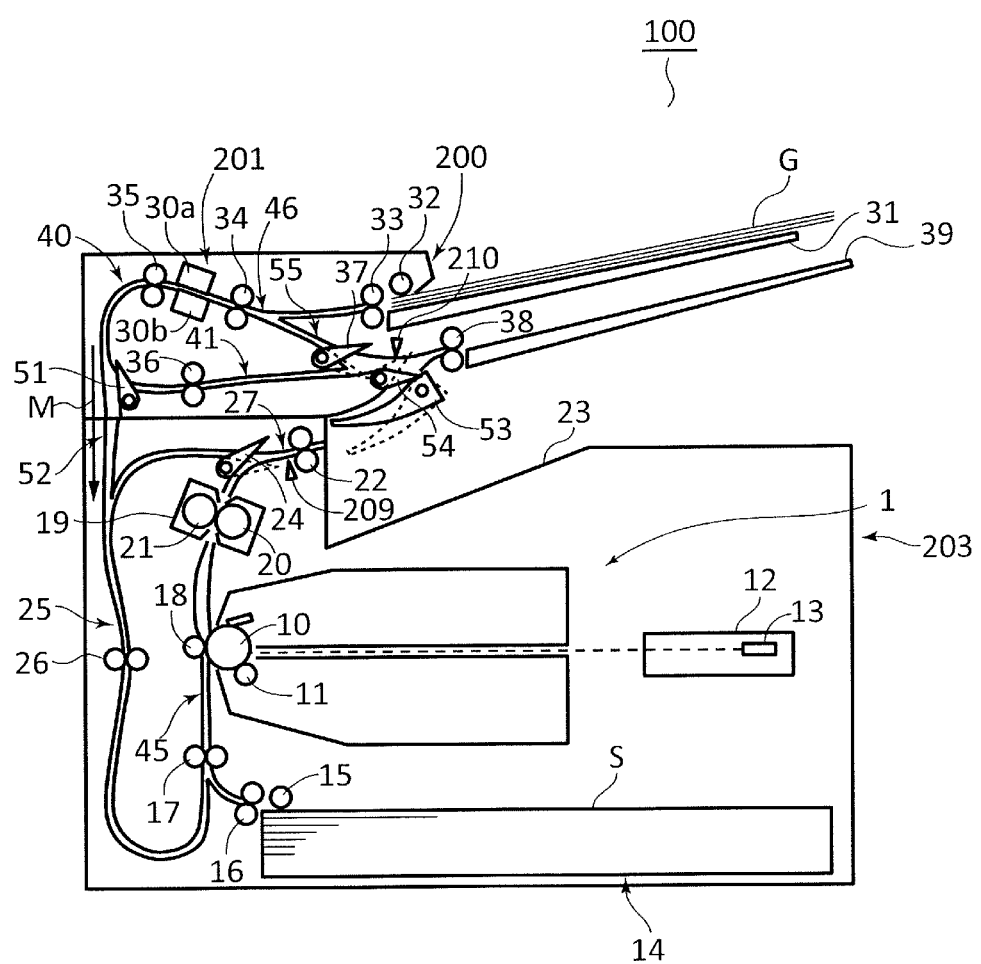
FIG. 2 illustrates an operation of the image forming apparatus according to the first exemplary embodiment.

FIG. 1 is a schematic section view of an image forming apparatus equipped with an image reading apparatus according to a first exemplary embodiment of the present invention. In the present exemplary embodiment, an aspect of the present invention is realized by an apparatus including a laser-beam printer of an electrophotographic system and an image scanner of a sheet-through type. However, the present invention is not limited to this embodiment and is widely applicable to image forming apparatuses employing other systems. In the description that will be given below, a sheet fed from a first feed portion 14 and a sheet fed from a second feed portion 31 will be respectively referred to as, for example, a recording medium S and a document G. However, both of the recording medium S and the document G may be simply referred to as a sheet. That is, in the description below, each of the recording medium S and the document G may be replaced by a word "sheet".

Image Forming Apparatus

First, an overall configuration of an image forming apparatus 100 according to the present exemplary embodiment will be described with reference to FIG. 1. FIG. 1 is a schematic section view of the image forming apparatus 100 according to the present exemplary embodiment. As illustrated in FIG. 1, the image forming apparatus 100 includes an image forming portion 203 capable of forming an image and an image reading portion 200 disposed above the image forming portion 203. The image forming portion 203 includes a sheet feed portion 205 configured to feed a recording medium S and a control portion 204 configured to control the image forming portion 203, the image reading portion 200, and so forth.

Image Forming Portion

A first feed portion 14 supports a recording medium S. A feed roller 15 feeds the recording medium S supported by the first feed portion 14. A separation conveyance roller pair 16 separates recording media S such that the recording medium S fed by the feed roller 15 is conveyed one by one. The first feed portion 14 and the feed roller 15 may be also collectively called as the sheet feed portion 205. A registration roller pair 17 conveys the recording medium S separated and conveyed by the separation conveyance roller pair 16 to a transfer portion T at a timing matching transfer of a toner image formed on a surface of a photosensitive drum 10. A conveyance path through which the recording medium S is conveyed from the registration roller pair 17 to the transfer portion T is called as an image formation conveyance path 45.

The photosensitive drum 10 is a rotatable image bearing member on which a toner image is to be formed. An optical unit 12 includes a light emitting portion 13 and forms an electrostatic latent image on the photosensitive drum 10. The light emitting portion 13 irradiates the photosensitive drum 10 with laser light. A developing roller 11 develops the electrostatic latent image formed on the photosensitive drum 10 as a toner image. A transfer roller 18 transfers the toner image formed on the photosensitive drum 10 onto the recording medium S. The photosensitive drum 10, the optical unit 12, and the developing roller 11 may be also collectively called as an image forming unit 1. The transfer portion T is constituted by the photosensitive drum 10 and the transfer roller 18.

A fixing portion 19 includes a heating portion 20 and a pressurizing roller 21, and fixes the unfixed toner image transferred from the photosensitive drum 10 onto the recording medium S. The heating portion 20 heats the recording medium S, and the pressurizing roller 21 pressurizes the recording medium S. A sheet detection sensor 209 detects a conveyance state of the recording medium S being conveyed in a discharge conveyance path 27. A discharge roller pair 22 serving as a discharging portion discharges the recording medium S onto which an image has been fixed by the fixing portion 19 from the image forming portion 203. A first sheet discharged portion 23 serving as a supporting portion supports the recording medium S discharged by the discharge roller pair 22. The rotation direction of the discharge roller pair 22 can be switched between a normal rotation direction and a reverse rotation direction by a switching mechanism that is not illustrated. The discharge roller pair 22 is capable of inverting the recording medium S and conveying the recording medium S back into the image forming portion 203 in an arrow B direction by switching the rotation direction before the recording medium S is completely discharged. In addition, it can be also said that the discharge roller pair 22 also serves as an inversion re-conveyance portion that inverts the recording medium S and conveys the recording medium S again to the image forming portion 203 so as to form an image on a lower surface of the recording medium S on an upper surface of which an image has been already formed by the image forming portion 203. The upper surface and the lower surface will be also respectively referred to as a first surface and a second surface. The inversion is performed such that a leading end and a trailing end of the recording medium S are interchanged. A conveyance path through which the recording medium S is conveyed from the transfer portion T to the discharge roller pair 22 is called as the discharge conveyance path 27.

A duplex inversion switching member 24 is disposed between the fixing portion 19 and the discharge roller pair 22, and switches between guiding the recording medium S onto which an image has been fixed by the fixing portion 19 to be conveyed to the discharge roller pair 22 and guiding the recording medium S inverted by the discharge roller pair 22 to be conveyed to a duplex conveyance path 25. The duplex inversion switching member 24 is supported so as to be pivotable between a solid line position and a broken line position about a pivot shaft 24a. The solid line position illustrated by solid lines in FIG. 1 is set as an initial position, and the position of the duplex inversion switching member 24 is switched to the broken line position illustrated by broken lines as a result of being driven by a first solenoid SL1 illustrated in FIG. 8 that is an actuator. Alternatively, the duplex inversion switching member 24 may be configured such that the broken line position illustrated in FIG. 1 is set as the initial position, and that the duplex inversion switching member 24 is urged in a clockwise direction by a spring or the like that is not illustrated and pivots to the solid line position as a result of being pushed open by a leading end of the recording medium S that has reached the duplex inversion switching member 24. In a state where the duplex inversion switching member 24 is at the solid line position, the duplex inversion switching member 24 guides the recording medium S onto which an image has been fixed by the fixing portion 19 to be conveyed to the discharge roller pair 22. In a state where the duplex inversion switching member 24 is at the broken line position, the duplex inversion switching member 24 guides the recording medium S inverted by the discharge roller pair 22 to be conveyed to the duplex conveyance path 25. The inverted recording medium S is conveyed through a re-conveyance path 47 and the duplex conveyance path 25. A duplex conveyance roller pair 26 conveys the recording medium S again to the registration roller pair 17 from the duplex conveyance path 25. Then, an image is formed on the second surface of the recording medium S. Through the re-conveyance path 47, the recording medium S conveyed in the image formation conveyance path 45 toward the first sheet discharged portion 23 can be conveyed again to the image forming unit 1.

Image Reading Portion

A second feed portion 31 supports a document G. A feed roller 32 feeds the document G supported by the second feed portion 31. A separation conveyance roller pair 33 separates documents G such that the document G fed by the feed roller 32 is conveyed one by one. A conveyance roller pair 34 conveys the document G separated and conveyed by the separation conveyance roller pair 33 to the image reading section 201. A conveyance path through which the document G is conveyed from the second feed portion 31 to the image reading section 201 is called as a reading guide path 46. The image reading section 201 includes an image reading unit 30a and an image reading unit 30b disposed so as to oppose each other with a conveyance path through which the document G is conveyed interposed therebetween. The image reading unit 30a reads an image on an upper surface of the document G, and the image reading unit 30b reads an image on a lower surface of the document G. The upper surface and the lower surface will be also respectively referred to as a first surface and a second surface. The image reading section 201 including these components reads an image formed on the document G. Although a configuration in which two image reading units are provided will be described as an example, a configuration in which only one of these image reading units is provided may be employed. The image reading units 30a and 30b each serving as an image reading portion respectively include contact image sensors: CISs 208a and 208b.

A conveyance roller pair 35 conveys the document G in a document conveyance path 40. A conveyance roller pair 36 conveys the document G in a downstream document conveyance path 41. A sheet detection sensor 210 detects a conveyance state of the document G being conveyed in the downstream document conveyance path 41. A document discharge roller pair 38 serving as a conveyance portion discharges the document G from the image reading portion 200. The document G discharged by the document discharge roller pair 38 is supported by a second sheet discharged portion 39 serving as a read sheet supporting portion configured to support a sheet. The rotation direction of the document discharge roller pair 38 can be switched between a normal rotation direction and a reverse rotation direction by a switching mechanism that is not illustrated. The document discharge roller pair 38 is capable of inverting the document G and conveying the document G back into the image reading portion 200 by switching the rotation direction before the document G is completely discharged.

A reading inversion switching member 37 is disposed between the conveyance roller pair 36 and the document discharge roller pair 38. The reading inversion switching member 37 switches between guiding the document G to be conveyed from the conveyance roller pair 36 to the document discharge roller pair 38 and guiding the document G inverted by the document discharge roller pair 38 to be conveyed again to the image reading section 201. The reading inversion switching member 37 is supported so as to be pivotable between a solid line position and a broken line position about a pivot shaft 37a. The solid line position illustrated in FIG. 1 is set as an initial position, and the position of the reading inversion switching member 37 is switched to the broken line position as a result of being driven by a second solenoid SL2 illustrated in FIG. 8 that is an actuator. Alternatively, the reading inversion switching member 37 may be configured such that the broken line position illustrated in FIG. 1 is set as the initial position, and that the reading inversion switching member 37 is urged in a clockwise direction and pivots to the solid line position as a result of being pushed open by a leading end of the document G that has been conveyed to the reading inversion switching member 37. In a state where the reading inversion switching member 37 is at the solid line position, the reading inversion switching member 37 guides the document G to be conveyed from the conveyance roller pair 36 to the document discharge roller pair 38. In a state where the reading inversion switching member 37 is at the broken line position, the reading inversion switching member 37 guides the document G inverted by the document discharge roller pair 38 to be conveyed again to the image reading section 201. The inverted document G is conveyed again to the conveyance roller pair 34 through a document inversion conveyance path 55.

Connection Between Image Forming Portion and Image Reading Portion

A recording medium reading switching member 53 serving as a switching portion switches between guiding the recording medium S discharged by the discharge roller pair 22 serving as a discharging portion to be discharged to the first sheet discharged portion 23 and guiding the recording medium S to be conveyed to the image reading portion 200. The recording medium reading switching member 53 is disposed above the first sheet discharged portion 23 serving as a first supporting portion, and is supported so as to be pivotable between a solid line position and a broken line position about a pivot shaft 53a. That is, the recording medium reading switching member 53 is configured to switch between a first position to cause the sheet discharged by the discharging portion 22 to be conveyed to the supporting portion 23 and a second position to cause the sheet discharged by the discharging portion 22 to be conveyed toward the image reading portion 200 configured to read the image. The solid line position illustrated in FIG. 1 is set as an initial position, and the position of the recording medium reading switching member 53 is switched to the broken line position as a result of being driven by a fourth solenoid SL4 illustrated in FIG. 8 that is an actuator. In a state where the recording medium reading switching member 53 is at the solid line position, the recording medium reading switching member 53 guides the recording medium S to be discharged to the first sheet discharged portion 23. In a state where the recording medium reading switching member 53 is at the broken line position, the recording medium reading switching member 53 guides the recording medium S to be conveyed to the image reading portion 200.

A merge switching member 54 switches between accepting the recording medium S conveyed from the image forming unit 1 and guiding the recording medium S inverted by the document discharge roller pair 38 to be conveyed into the image reading portion 200. The merge switching member 54 is supported so as to be pivotable between a solid line position and a broken line position about a pivot shaft 54a. The solid line position illustrated in FIG. 1 is set as an initial position, and the position of the merge switching member 54 is switched to the broken line position as a result of being driven by a fifth solenoid SL5 illustrated in FIG. 8 that is an actuator. In a state where the merge switching member 54 is at the solid line position, the merge switching member 54 guides the recording medium S to be conveyed into the image reading portion 200. In a state where the merge switching member 54 is at the broken line position, the merge switching member accepts the recording medium S conveyed from the image forming unit 1.

An overwriting conveyance path 52 is a conveyance path that connects the document conveyance path 40 upstream thereof and the duplex conveyance path 25 so as to convey the document G from the document conveyance path 40 to the duplex conveyance path 25. An overwriting switching member 51 switches between guiding the document G whose image has been read by the image reading section 201 to be conveyed to the downstream document conveyance path 41 and guiding the document G to be conveyed to the overwriting conveyance path 52. The overwriting switching member 51 is supported so as to be pivotable between a solid line position and a broken line position about a pivot shaft 51a. The solid line position illustrated in FIG. 1 is set as an initial position, and the position of the overwriting switching member 51 is switched to the broken line position as a result of being driven by a third solenoid SL3 illustrated in FIG. 8 that is an actuator. In a state where the overwriting switching member 51 is at the solid line position, the overwriting switching member 51 guides the document G to be conveyed to the downstream document conveyance path 41. In a state where the overwriting switching member 51 is at the broken line position, the overwriting switching member 51 guides the document G to be conveyed to the overwriting conveyance path 52.

Control System

Figure 8:
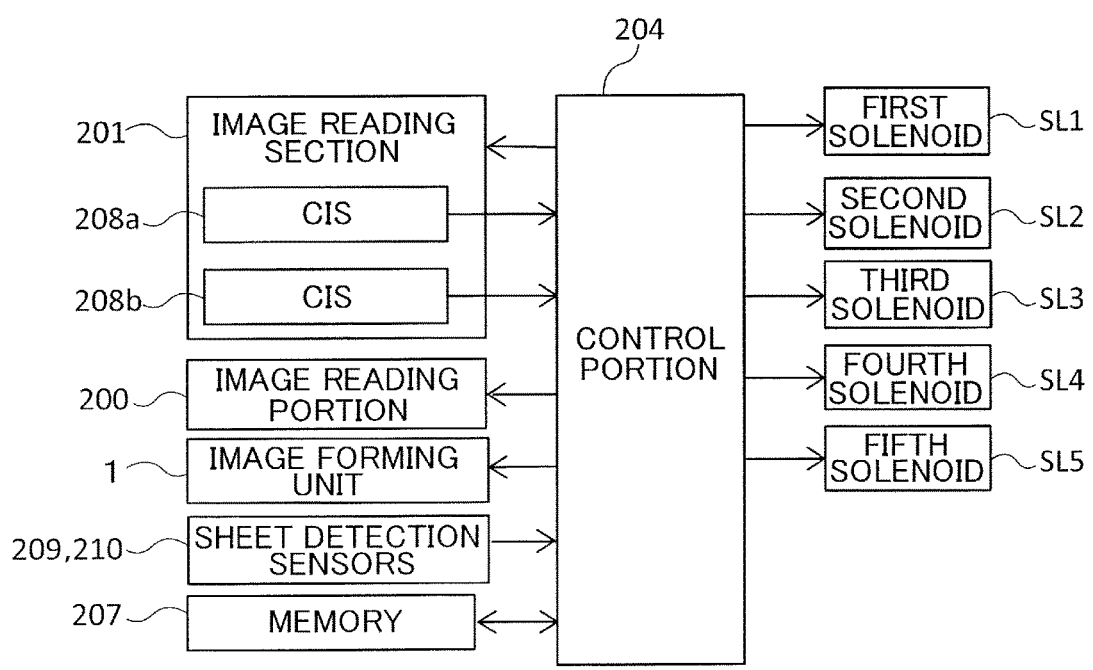
FIG. 8 is a control block diagram illustrating a control system of the image forming apparatus according to the first exemplary embodiment.

Next, a control system according to the present exemplary embodiment will be described with reference to FIG. 8. FIG. 8 is a control block diagram of a control system of the image forming apparatus 100 according to the present exemplary embodiment. The control portion 204 illustrated in FIGS. 1 and 8 controls an image forming operation of the image forming portion 203, an image reading operation of the image reading portion 200, and so forth. The control portion 204 is connected to the image reading section 201 including the CISs 208a and 208b, the image reading portion 200, the image forming unit 1, and the sheet detection sensors 209 and 210. Further, the control portion 204 is connected to a memory 207, conveyance rollers in the image forming portion 203, and so forth. Document image information read by the CISs 208a and 208b is stored on the memory 207.

In addition, the control portion 204 is connected to the first to fifth solenoids SL1 to SL5. The first solenoid SL1 provides the drive for switching the duplex inversion switching member 24. The second solenoid SL2 provides the drive for switching the reading inversion switching member 37. The third solenoid SL3 provides the drive for switching the overwriting switching member 51. The fourth solenoid SL4 provides the drive for switching the recording medium reading switching member 53. The fifth solenoid SL5 provides the drive for switching the merge switching member 54.

Image Formation Process

Next, an image formation process in the image forming unit 1 will be described. As illustrated in FIG. 1, the image forming unit 1 provided in the image forming apparatus 100 forms a toner image via a known electrophotographic image formation process. That is, the image forming unit 1 includes the photosensitive drum 10 and the developing roller 11 disposed therein. The photosensitive drum 10 is rotatable and serves as an image bearing member. The developing roller 11 is disposed parallel to and in contact with the photosensitive drum 10, and rotates while bearing toner. In the case where a print signal, in other words, a print job signal, is received, the light emitting portion 13 included in the optical unit 12 irradiates the electrified surface of the photosensitive drum with laser light, and thereby forms a latent image of charges on the surface of the rotating photosensitive drum 10. In the case where the developing roller 11 supplies toner to the latent image on the surface of the photosensitive drum 10 while rotating, a toner image is formed on the surface of the photosensitive drum 10.

The recording medium S set in the first feed portion 14 is conveyed one by one to the registration roller pair 17 by the feed roller 15 and the separation conveyance roller pair 16. The registration roller pair 17 conveys the recording medium S to the transfer portion T at such a timing that leading end positions of the toner image on the surface of the photosensitive drum 10 and the recording medium S match each other. The toner image conveyed to the transfer portion by the rotation of the photosensitive drum 10 is transferred onto the recording medium S by an application bias and a pressure applied to the transfer portion T.

Further, the recording medium S is conveyed to the fixing portion 19, and the toner image is fixed onto the recording medium S by the heat applied by the heating portion 20 and the pressure applied by the pressurizing roller 21 that is rotatable and opposes the heating portion 20. The recording medium S onto which the toner image has been fixed is conveyed to the discharge roller pair 22 through the discharge conveyance path 27.

In the case where the print signal is a signal for single-sided printing, the recording medium S that has been conveyed in an arrow A direction, has passed by the duplex inversion switching member 24, and has reached the discharge roller pair 22 is directly conveyed to the outside of the apparatus and discharged to the first sheet discharged portion 23 on the image forming portion 203 to be supported by the first sheet discharged portion 23. In this way, the image formation process of single-sided printing is completed.

In addition, in the case where the print signal is a signal for duplex printing, the following occurs after the recording medium S on the first surface of which printing has been completed is conveyed by the discharge roller pair 22 and the trailing end thereof passes by the duplex inversion switching member 24. That is, the position of the duplex inversion switching member 24 is switched to the broken line position by the first solenoid SL1 that is an actuator or by the urging force applied in the clockwise direction illustrated in FIG. 1, and the discharge roller pair 22 is caused to rotate in the reverse rotation direction by the switching portion that is not illustrated. The recording medium S conveyed in the reverse direction by the discharge roller pair 22 is guided to the duplex conveyance path 25 by the duplex inversion switching member 24. Then, the recording medium S is sent to the registration roller pair 17 by the duplex conveyance roller pair 26 and conveyed to the transfer portion T and the fixing portion 19 in an inverted state, and thus a toner image is transferred and fixed onto the second surface of the recording medium S. After this, the recording medium S is discharged to the first sheet discharged portion 23 by the discharge roller pair 22, and is supported by the first sheet discharged portion 23.

Image Reading Process

Next, an image reading process of the image reading portion 200 will be described with reference to FIG. 1.

In FIG. 1, the document G set on the second feed portion 31 is fed one by one by the feed roller 32 and the separation conveyance roller pair 33, and then is conveyed by the conveyance roller pair 34 and passes between the image reading units 30*a* and 30*b*. At this time, images on the upper surface and the lower surface of the document G are respectively read at image reading positions of the image reading units 30*a* and 30*b*. The document G that has passed between the image reading units 30*a* and 30*b* is conveyed to the document discharge roller pair 38 by the conveyance roller pairs 35 and 36. The document G passes by the reading inversion switching member 37 on the way to the document discharge roller pair 38. At this time, the reading inversion switching member 37 moves to the solid line position illustrated in FIG. 1 as a result of being opened by the second solenoid SL2 illustrated in FIG. 8 or being pushed open by the leading end of the document G. As a result of this, the document G that has reached the document discharge roller pair 38 is discharged to the second sheet discharged portion 39 by the document discharge roller pair 38 and is supported by the second sheet discharged portion 39.

Here, in the case where only one image reading unit is provided, this process may be performed as follows. For example, in the case where only the image reading unit 30*a* is provided in the apparatus, the rotation direction of the document discharge roller pair 38 is switched and the position of the reading inversion switching member 37 is switched to the broken line position after the upper surface of the document G is read and the trailing end of the document G passes by the reading inversion switching member 37. As a result of this, the document G is conveyed to the document inversion conveyance path 55 that is merged with the document conveyance path 40, i.e., the document inversion conveyance path 55 serves as a connecting path configured to connect a portion located upstream of the image reading portion in the conveyance direction of the sheet and a portion located downstream of the image reading portion. In this way, the document G can pass by the image reading unit 30*a* after being inverted, and thus both surfaces of the document G can be read.

Process of Overwriting Printing on Document

Next, a process of overwriting printing on the document G will be described with reference to FIGS. 1 to 4. In FIG. 1, the overwriting switching member 51 disposed in the document conveyance path 40 can be switched between the solid line position and the broken line position. At the solid line position, the document G conveyed through the document conveyance path 40 is sent to the document discharge roller pair 38. At the broken line position, the document G is sent to the overwriting conveyance path 52. That is, when the document G which has been fed from the second feed portion 31 and whose images have been read by the image reading units 30*a* and 30*b* reaches the overwriting switching member 51, the document G is sent to the overwriting conveyance path 52 by switching the position of the overwriting switching member 51 to a position illustrated in FIG. 2, and is then conveyed to the duplex conveyance path 25. Then, the document G is sent to the registration roller pair 17 by the duplex conveyance roller pair 26, and thus overwriting printing on the document G can be performed.

Figure 3:
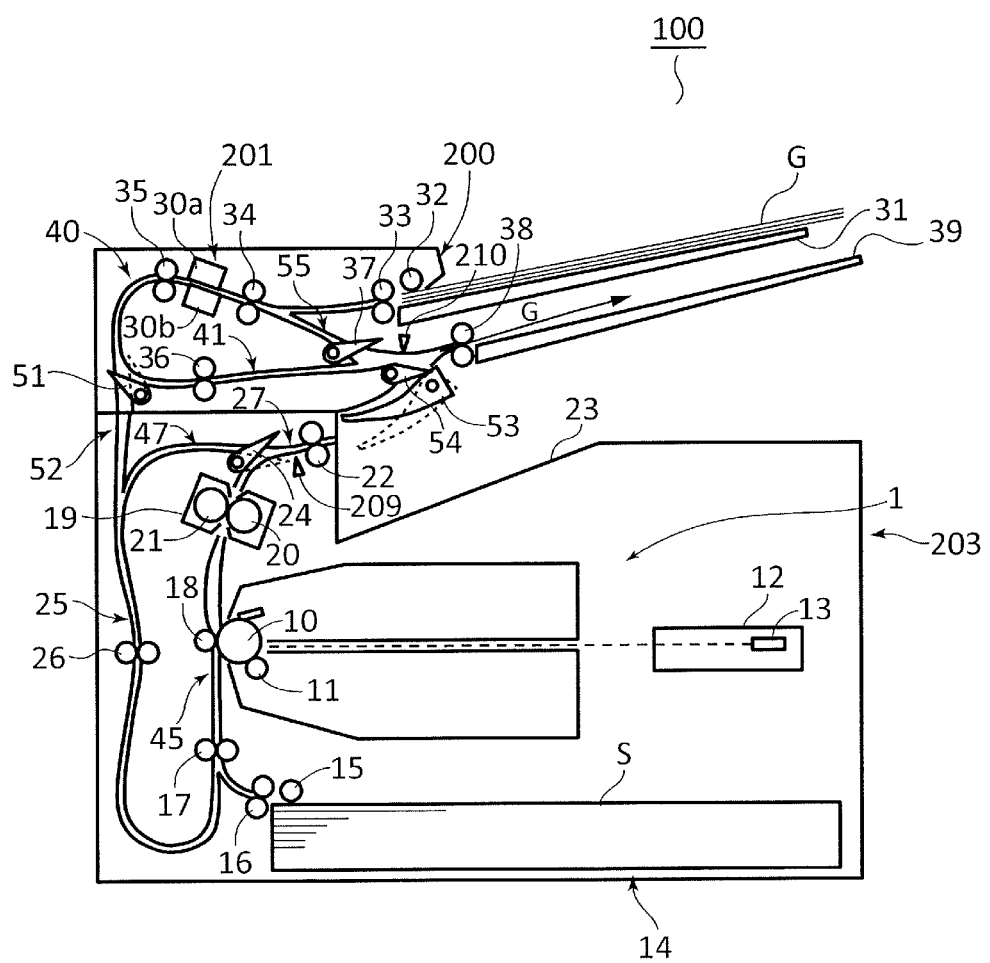
FIG. 3 illustrates an operation of the image forming apparatus according to the first exemplary embodiment.
Figure 4:
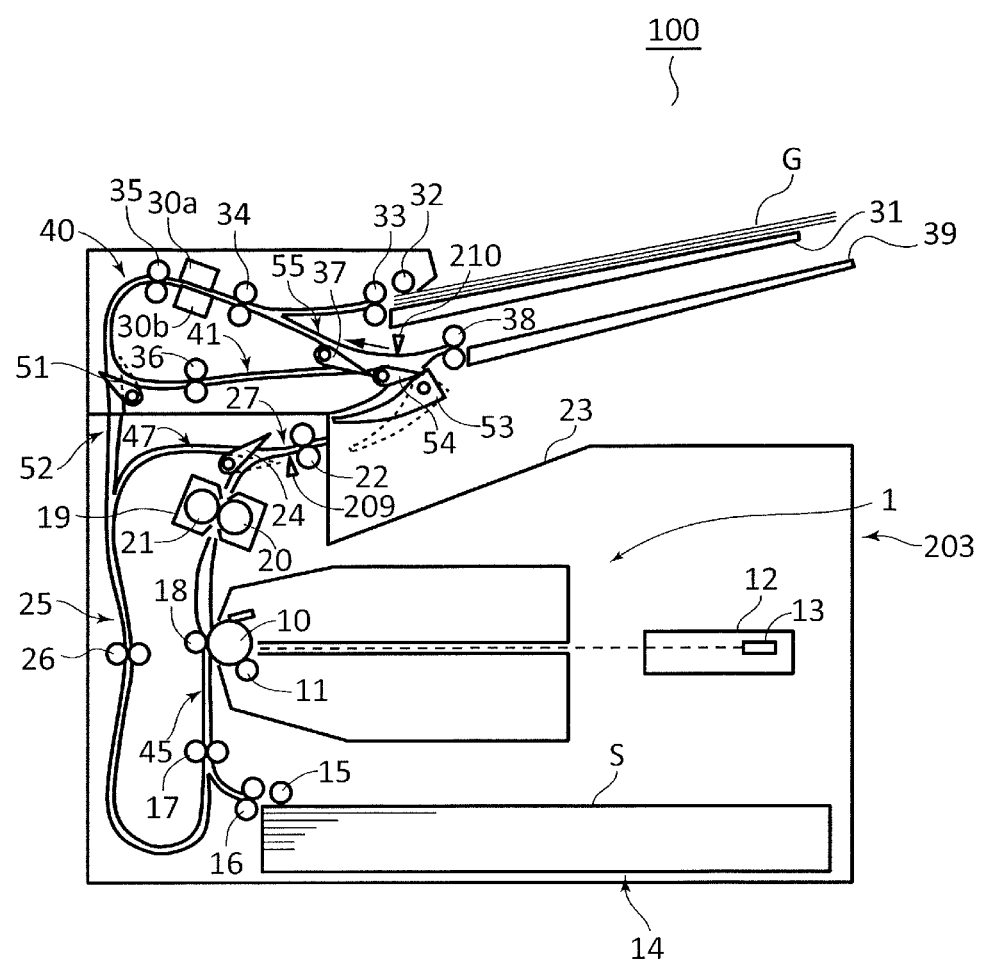
FIG. 4 illustrates an operation of the image forming apparatus according to the first exemplary embodiment.

Alternatively, the document G may be caused to temporarily wait inside the image reading section 201 before sending the document G to the image forming unit 1. In this case, when the document G that has been sent in from the second feed portion 31 and whose images have been read by the image reading units 30*a* and 30*b* reaches the overwriting switching member 51, the overwriting switching member 51 moves to the solid line position illustrated in FIG. 1 such that the document G is conveyed toward the document discharge roller pair 38. As illustrated in FIG. 3, the conveyance of the document G is temporarily stopped after the trailing end of the document G passes by the reading inversion switching member 37. The content of overwriting printing can be processed in this waiting time by analyzing the read image information of the document G. Then, the reading inversion switching member 37 is switched by the second solenoid SL2 illustrated in FIG. 8 or by the urging force applied in the clockwise direction as illustrated in FIG. 4, the rotation direction of the document discharge roller pair 38 is switched to the reverse rotation direction, and the document G is sent to the document inversion conveyance path 55 and then to the document conveyance path 40. After that, when the document G reaches the overwriting switching member 51 again, the document G is sent to the overwriting conveyance path 52 by switching the position of the overwriting switching member 51 to the position illustrated in FIG. 2, and thus overwriting printing can be performed on the document G.

Reading Process of Recording Medium

Next, a reading process of the recording medium S will be described with reference to FIGS. 1, 5, and 6. In FIG. 1, the recording medium reading switching member 53 disposed downstream of the discharge roller pair 22 and above the first sheet discharged portion 23 can be switched between the solid line position to cause the recording medium S discharged by the discharge roller pair 22 to be discharged to the first sheet discharged portion 23 and the broken line position to cause the recording medium S to be sent to the document discharge roller pair 38.

Figure 5:
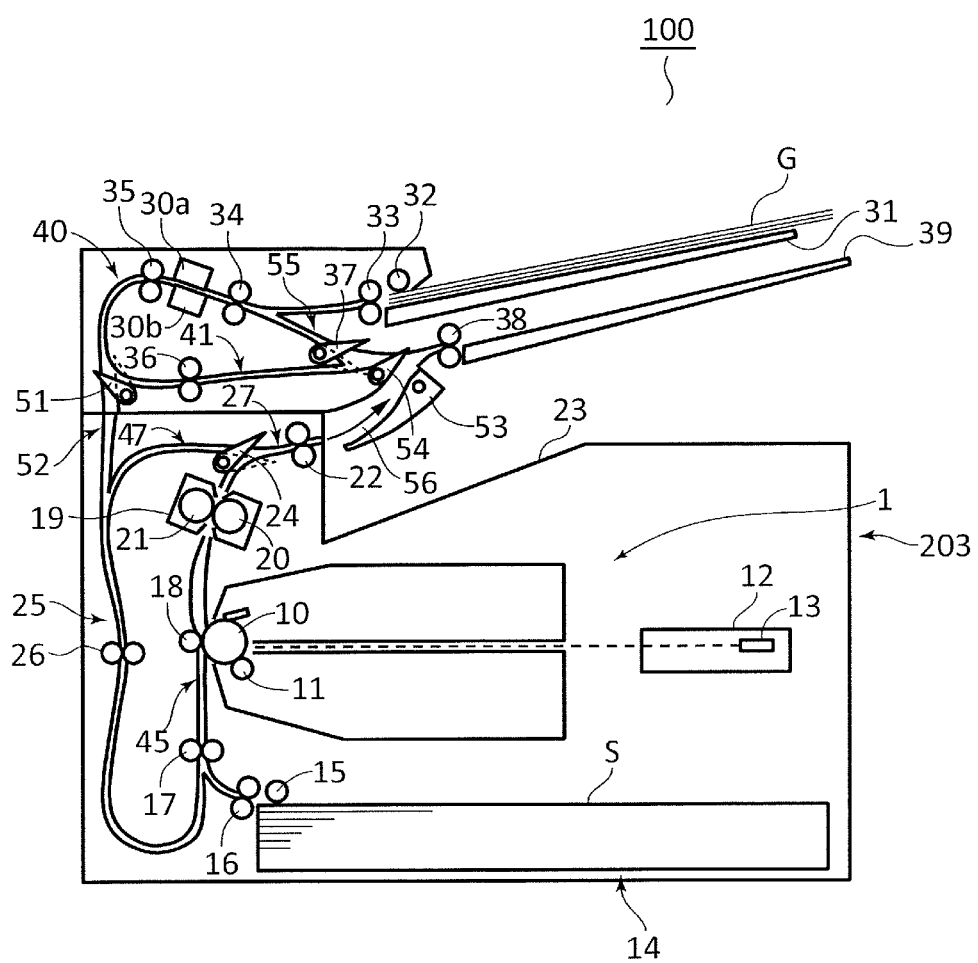
FIG. 5 illustrates an operation of the image forming apparatus according to the first exemplary embodiment.
Figure 6:
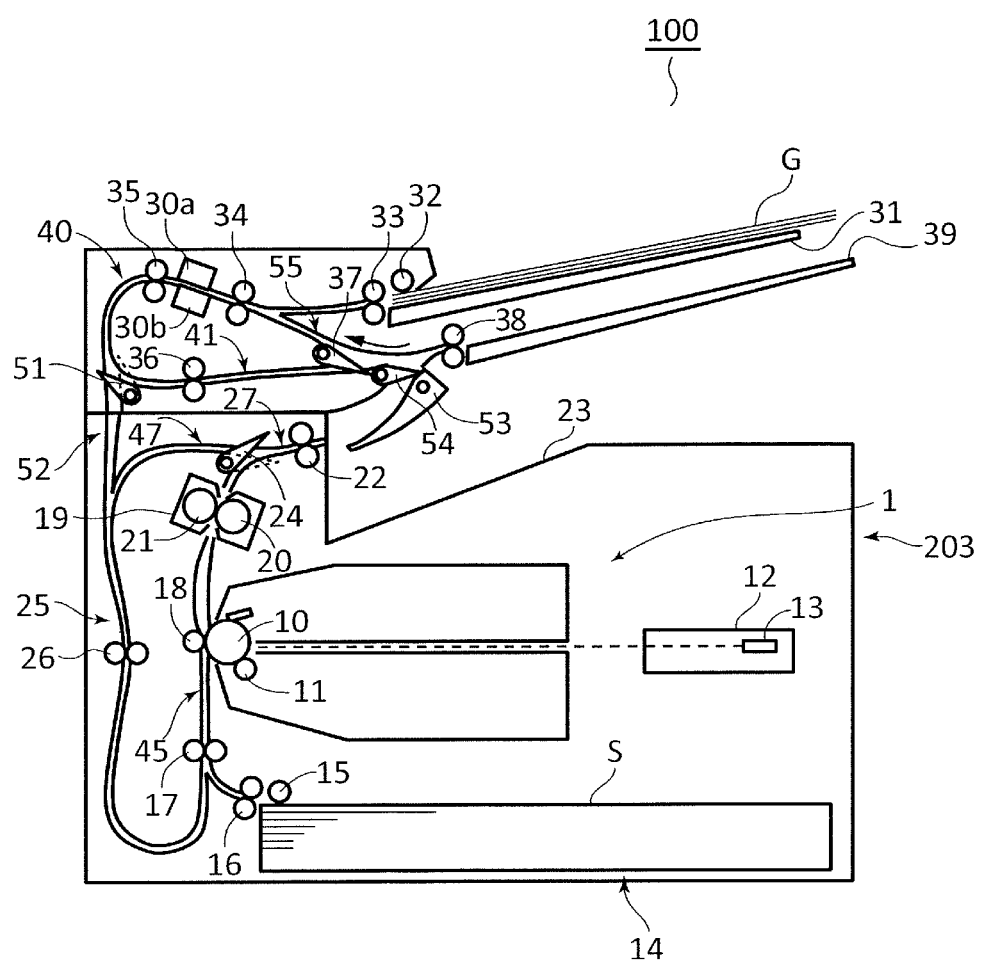
FIG. 6 illustrates an operation of the image forming apparatus according to the first exemplary embodiment.

When the recording medium reading switching member 53 is at a position illustrated in FIG. 5, the recording medium S on which an image has been formed is guided by the recording medium reading switching member 53 to pass by the merge switching member 54 to be conveyed to the document discharge roller pair 38, and is conveyed by the document discharge roller pair 38. After the trailing end of the recording medium S passes by the merge switching member 54, the rotation direction of the document discharge roller pair 38 is switched to the reverse rotation direction with the reading inversion switching member 37 switched to the broken line position, and thus the following occurs. That is, as illustrated in FIG. 6, the recording medium S is sent to the image reading units 30a and 30b through the document inversion conveyance path 55 and the document conveyance path 40. In this way, the image on the recording medium S can be read. After that, the recording medium S is sent again to the document discharge roller pair 38 by the conveyance roller pair 36, and is discharged to the second sheet discharged portion 39 to be supported by the second sheet discharged portion 39.

According to this configuration, after the whole of the recording medium S including the trailing end passes through the fixing portion 19 of the image forming unit 1 and the discharge roller pair 22 and thus the conveyance by the discharge roller pair 22 is completed, the recording medium S passes between the image reading units 30a and 30b of the image reading section 201. Accordingly, the conveyance speed of the image forming unit 1 does not affect the reading precision in reading the image on the recording medium S to lower the reading precision.

In other words, the image forming apparatus 100 includes a first sheet conveyance path 45, 27, 47, and 25 as a conveyance path through which a sheet on which an image is to be formed by the image forming unit 1. In addition, a second sheet conveyance path 40, 41, and 46 is configured independently from the first sheet conveyance path 45, 27, 47, and 25 as a conveyance path through which a sheet whose images are to be read by image reading portions 30a and 30b. The first and second sheet conveyance paths are bypassed by a bypassing path 56 illustrated in FIG. 5 and configured by the recording medium reading switching member 53 described above. In addition, the discharge roller pair 22 is disposed in the first sheet conveyance path as sending rollers that send the sheet on which an image has been formed by the image forming unit 1 into the second sheet conveyance path. Images on the sheet sent into the second sheet conveyance path by the discharge roller pair 22 serving as the sending rollers are read by the image reading portions 30a and 30b after the trailing end of the sheet is released from the discharge roller pair 22. More specifically, in the present exemplary embodiment, the document discharge roller pair 38 is provided as receiving rollers that are disposed in the second sheet conveyance path and receive the sheet conveyed by the discharge roller pair 22. The document discharge roller pair 38 is controlled by the control portion 204 so as to invert the sheet conveyed by the discharge roller pair 22 and convey the sheet to the image reading portions 30a and 30b. According to this, the images of the sheet can be read after the trailing end of the sheet is released from the discharge roller pair 22 even though the discharge roller pair 22 and the image reading portions 30a and 30b are not separated by a long distance.

Under control of the control portion 204, the document discharge roller pair 38 is driven at a conveyance speed of the image forming unit 1 serving as a first conveyance speed in a period before the trailing end of the recording medium S is released from the discharge roller pair 22. In a period after the recording medium S is released from the discharge roller pair 22, the recording medium S can be conveyed at an arbitrary speed serving as a second conveyance speed that is not related to the conveyance speed of the image forming unit 1. For example, if the conveyance speed is changed to a faster speed after the trailing end of the recording medium S is released from the discharge roller pair 22 or when the document discharge roller pair 38 is desired to rotate in the reverse rotation direction, the productivity of the apparatus will be improved. Alternatively, the conveyance speed may be slower in the case where the image reading is performed at a high resolution in accordance with the performance of the image reading units 30a and 30b.

Further, according to the configuration of FIG. 1, since an inversion path for the case of reading an image on the recording medium S is shared with the second sheet discharged portion 39, it is not required to provide an exclusive space for securing a conveyance path of a certain length, and thus miniaturization of the apparatus can be realized.

Figure 7:
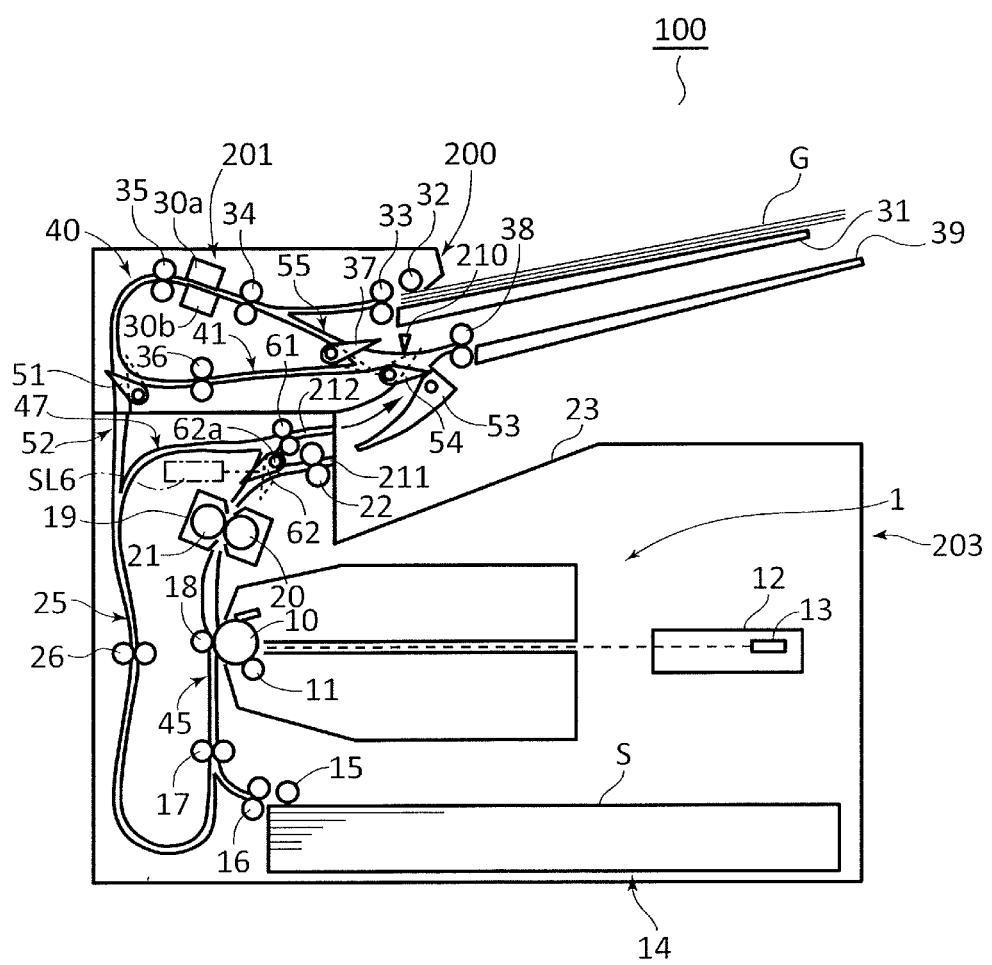
FIG. 7 is a schematic section view of the image forming apparatus including the image reading portion according to the first exemplary embodiment.

Alternatively, the image forming apparatus 100 may be configured such that the image forming unit 1 includes a duplex inversion roller pair 61 in addition to the discharge roller pair 22 as illustrated in FIG. 7. In this configuration, when performing duplex printing, the leading end of the recording medium S is guided toward the duplex inversion roller pair 61 by a duplex switching member 62, and then the duplex inversion roller pair 61 is caused to rotate in the reverse rotation direction. Thus, the recording medium S is conveyed to the duplex conveyance path 25 and thereby duplex printing is performed. Providing the duplex inversion roller pair 61 in addition to the discharge roller pair 22 enables discharging another recording medium S from the discharge roller pair 22 while conveying a recording medium S by the duplex inversion roller pair 61, and thus the productivity of the apparatus is improved.

The recording medium S can be also passed from the discharge roller pair 22 to the image reading portion 200 in a similar manner in the image forming apparatus 100 of such a configuration. The image forming unit 1 may be controlled such that the recording medium S is directly discharged to the outside of the apparatus without rotting the duplex inversion roller pair 61 in the reverse rotation direction after being sent toward the duplex inversion roller pair 61, and thus the recording medium S sent to the duplex inversion roller pair 61 may be guided to the image reading section 201 by the recording medium reading switching member 53. In this case, image reading can be also performed without being affected by the image forming unit 1 by configuring the subsequent conveyance paths in a similar manner to the configuration described above.

Second Exemplary Embodiment

Figure 9:
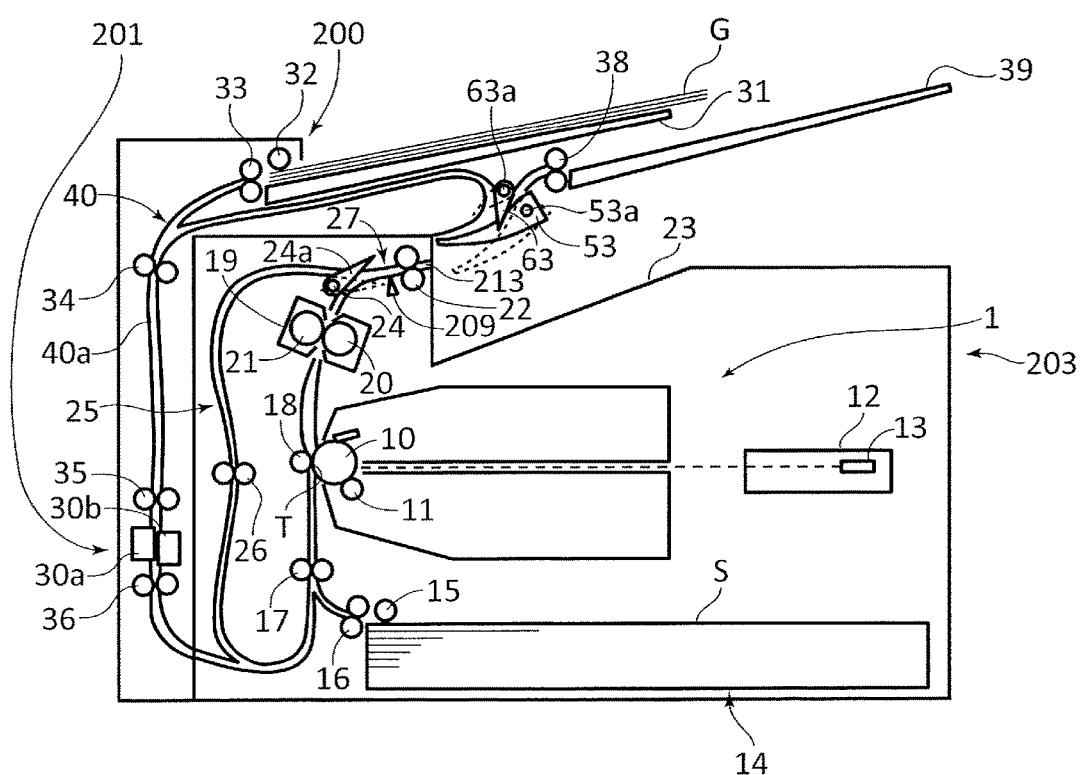
FIG. 9 is a schematic section view of an image forming apparatus according to a second exemplary embodiment of the present invention.

Next, a second exemplary embodiment of the present invention will be described with reference to FIG. 9. FIG. 9 is a schematic section view of an image forming apparatus 101 according to the present exemplary embodiment. In the present exemplary embodiment, the same members as the first exemplary embodiment will be denoted with the same reference letters, and descriptions of members having the same configuration and the same function will be omitted.

In the present exemplary embodiment, a switching member 63 is supported so as to be pivotable about a pivot shaft 63a. The switching member 63 switches, by being driven by an actuator that is not illustrated, between guiding the recording medium S sent to the image reading section 201 via the recording medium reading switching member 53 to the document discharge roller pair 38 and guiding the recording medium S to the document conveyance path 40.

The document conveyance path 40 according to the present exemplary embodiment has such a shape as to cause the document G to make a U-turn at a position downstream of the switching member 63 as illustrated in FIG. 9. As illustrated in FIG. 9, this document conveyance path 40 constitutes a path through which the recording medium S is guided to the image reading units 30a and 30b disposed to the lower-left of the image forming portion 203.

Here, the length of the portion of the document conveyance path 40 from the discharge roller pair 22 to the image reading unit 30a and 30b is configured to be longer than the length of the sheet of the recording medium S having the maximum size usable in the image forming apparatus 100 in the conveyance direction. That is, a guide path 40a serving as a sheet guide path which is capable of guiding the recording medium S discharged from the discharge roller pair 22 and whose length of the portion from the discharge roller pair 22 to the image reading units 30a and 30b is longer than the length of the recording medium S of the maximum usable size in the conveyance direction is provided. This enables causing the recording medium S to pass between the image reading units 30a and 30b after the whole of the recording medium S including the trailing end thereof in the conveyance direction is released from the discharge roller pair 22 similarly to the first exemplary embodiment.

In the configuration illustrated in FIG. 9, the recording medium S that has passed between the image reading units 30a and 30b is sent again to the image forming unit 1, passes through the image forming unit 1 and is discharged from the discharge roller pair 22. At this time, the recording medium S may be discharged to and supported by the first sheet discharged portion 23 by switching the recording medium reading switching member 53 to the solid line position. Alternatively, the recording medium S may be sent to the document discharge roller pair 38 and discharged to and supported by the second sheet discharged portion 39 by switching the recording medium reading switching member 53 to the broken line position and switching the switching member 63 to the broken line position.

In addition, in the case of reading an image on the document G, the document G whose images have been read by the image reading unit 30a and 30b may be sent to the image forming unit 1 in a similar manner, and discharged to and supported by the first sheet discharged portion 23 or the second sheet discharged portion 39.

The recording medium S on which an image has been formed by the image forming unit 1 can be conveyed to the image reading section 201 and subjected to image reading also according to the present exemplary embodiment, and thus it becomes possible to set a conveyance condition in the image reading section 201 without being affected by a sheet conveyance condition in the image forming portion 203.

Third Exemplary Embodiment

Figure 10:
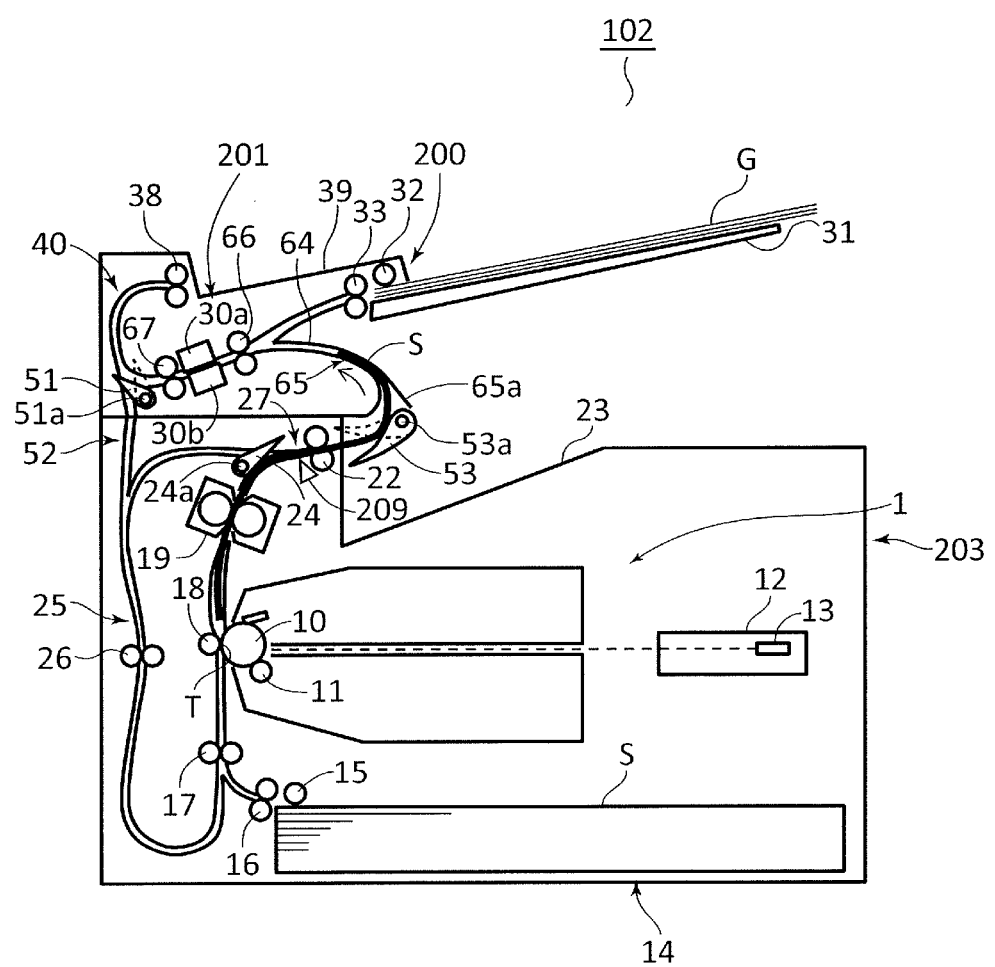
FIG. 10 is a schematic section view of an image forming apparatus according to a third exemplary embodiment of the present invention.
Figure 11:
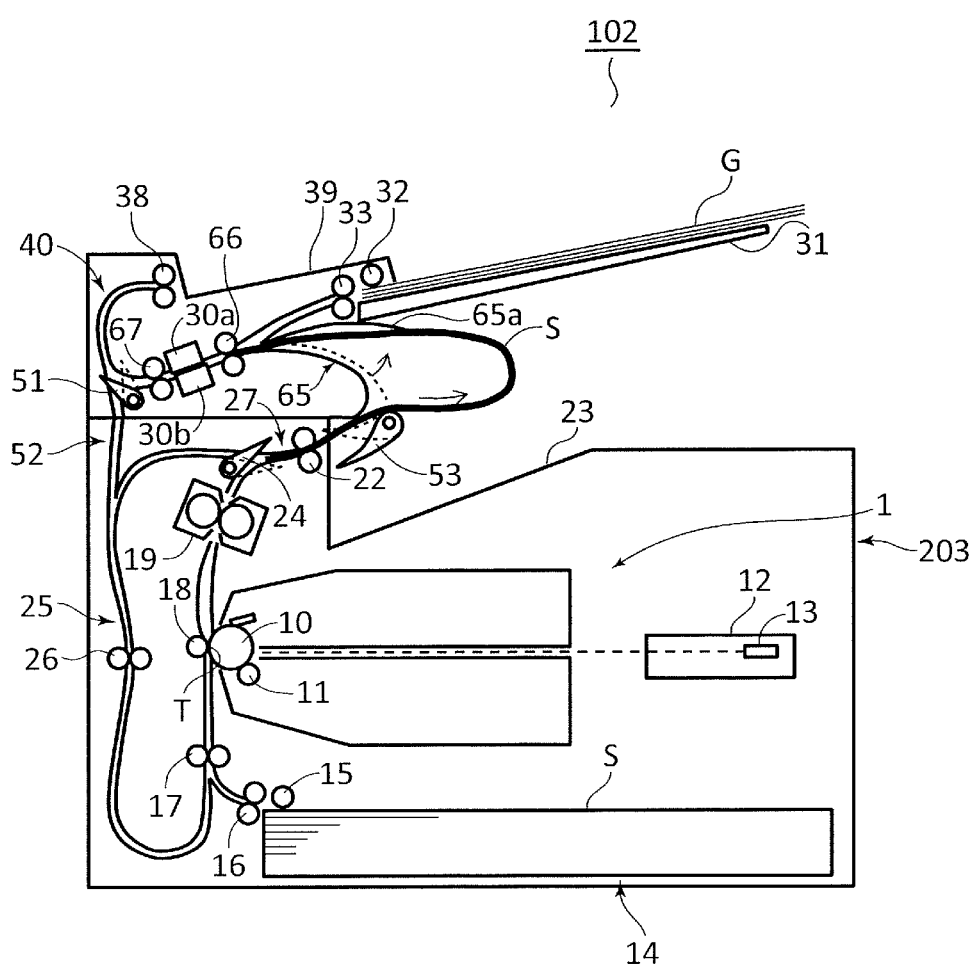
FIG. 11 illustrates an operation of the image forming apparatus according to the third exemplary embodiment.
Figure 12:
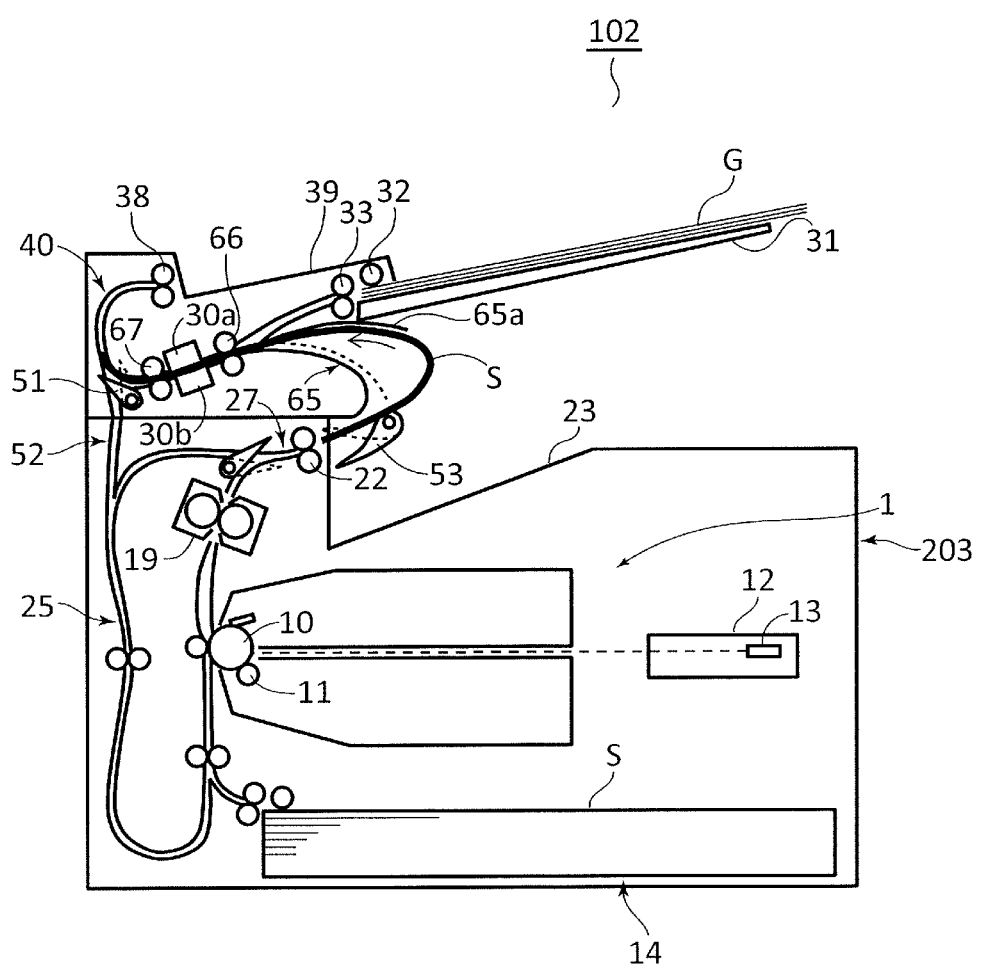
FIG. 12 illustrates an operation of the image forming apparatus according to the third exemplary embodiment.

Next, a third exemplary embodiment of the present invention will be described with reference to FIGS. 10 to 12. FIG. 10 is a schematic section view of an image forming apparatus 102 according to the present exemplary embodiment, FIG. 11 illustrates an operation of the image forming apparatus 102 by showing the image forming apparatus 102 in a state different from FIG. 10, and FIG. 12 illustrates an operation of the image forming apparatus 102 by showing the image forming apparatus 102 in a state different from FIG. 11. In the present exemplary embodiment, the same members as the first exemplary embodiment will be denoted with the same reference letters, and descriptions of members having the same configuration and the same function will be omitted.

The image forming apparatus 102 according to the present exemplary embodiment includes a reading conveyance path 64 having a U-turn shape that guides the recording medium S having been sent to the image reading section 201 as a result of switching of the recording medium reading switching member to the image reading units 30a and 30b. The reading conveyance path 64 includes a movable guide portion 65 having a shape curved from the position of the discharge roller pair 22 in FIG. 10 toward a conveyance roller pair 66 serving as a conveyance portion disposed upstream of the image reading units 30a and 30b. A conveyance roller pair 67 is disposed downstream of the image reading units 30a and 30b. The movable guide portion 65 includes a periphery guide 65a on the periphery closer to the second feed portion 31. The periphery guide 65a is configured to have flexibility to be pivotable, or movable, with a pivot base portion as a support as illustrated in FIGS. 10 to 12.

As illustrated in FIG. 10, when guiding the recording medium S to the reading conveyance path 64 by switching the recording medium reading switching member 53, the conveyance roller pair 66 upstream of the image reading units 30a and 30b is kept in a state where the rotation thereof is stopped under control of the control portion 204 illustrated in FIG. 8. The movable guide portion 65 is configured so as to be capable of accommodating the recording medium S conveyed from the discharge roller pair 22 between the discharge roller pair 22 and the image reading units 30a and 30b. The control portion 204 drives the discharge roller pair 22 such that, in a period before the trailing end of the recording medium S is released from the discharge roller pair 22, the leading end of the recording medium S in the conveyance direction abuts the conveyance roller pair 66 that is stopped, and a part of a loop of the recording medium S projects from the periphery guide 65a of the movable guide portion 65. After the trailing end of the recording medium S in the conveyance direction is released from the discharge roller pair 22, the control portion 204 drives the conveyance roller pair 66 such that the recording medium S is conveyed from the inside of the movable guide portion 65 toward the image reading units 30a and 30b.

In this way, when the leading end of the recording medium S reaches the conveyance roller pair 66, the recording medium S stops with the leading end abutting a nip portion of the conveyance roller pair 66 as illustrated in FIG. 11. Then, since the trailing end side of the recording medium S remains being conveyed by the discharge roller pair 22, more of the recording medium S is sent out from the discharge roller pair 22, and the warp of the recording medium S becomes greater. Thus, the periphery guide 65a is caused to pivot to a position illustrated in FIG. 11 due to the resilience of the recording medium S. Alternatively, a configuration in which the periphery guide 65a is warped upwards in the figure may be employed instead of the configuration in which the periphery guide 65a is caused to pivot.

After the trailing end of the recording medium S is released from the discharge roller pair 22, conveyance of the leading end side of the recording medium S is started by driving the conveyance roller pair 66 as illustrated in FIG. 12. Then, the recording medium S is discharged to the second sheet discharged portion 39 by the document discharge roller pair 38 as a result of switching the overwriting switching member 51 and is supported by the second sheet discharged portion 39 after the images on the recording medium S is read by passing between the image reading units 30a and 30b.

According to the present exemplary embodiment, the recording medium S on which an image has been formed can be also caused to pass between the image reading units 30a and 30b after the trailing end of the recording medium S in the conveyance direction is released from the discharge roller pair 22 similarly to the first exemplary embodiment.

This enables setting the conveyance condition in the image reading section 201 without being affected by the sheet conveyance direction in the image forming portion 203.

In the first to third exemplary embodiments described above, examples using the image forming apparatuses 100 to 102 employing an electrophotographic system have been described. Alternatively, instead of this, the present invention may be applied to, for example, an image forming apparatus employing an inkjet system in which an image is formed on a sheet by ejecting liquid ink from nozzles.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-085610, filed Apr. 21, 2016, which is hereby incorporated by reference wherein in its entirety.

What is claimed is:

1. An image forming apparatus comprising:
an image forming unit configured to form an image on a sheet;
a discharging portion configured to discharge the sheet on which the image has been formed to an outside of the image forming apparatus;
a supporting portion configured to support the sheet discharged by the discharging portion;
an image reading portion configured to read, at a reading position, the image formed on the sheet;
a switching portion configured to switch between a first position to cause the sheet discharged by the discharging portion to be conveyed to the supporting portion and a second position to cause the sheet discharged by the discharging portion to be conveyed toward the image reading portion configured to read the image;
a conveyance portion configured to convey the sheet;
a control portion configured to control switching of the switching portion; and
a read sheet supporting portion configured to support the sheet whose image has been read by the image reading portion,
wherein the sheet conveyed toward the image reading portion due to the switching portion is conveyed to the reading position after conveyance of the sheet by the discharging portion is finished; and
wherein the control portion is configured to cause the sheet to be conveyed at a first conveyance speed in a period before a trailing end of the sheet is released from the discharging portion in a conveyance direction of the sheet and to cause the sheet to be conveyed at a second conveyance speed different from the first conveyance speed in a period after the trailing end of the sheet is released from the discharging portion in the conveyance direction of the sheet.

2. The image forming apparatus according to claim 1, wherein the first conveyance speed is a conveyance speed used in forming the image on the sheet, and the second conveyance speed is a conveyance speed used in reading the image on the sheet.

3. The image forming apparatus according to claim 1, wherein the second conveyance speed is faster than the first conveyance speed.

4. The image forming apparatus according to claim 1, wherein the second conveyance speed is slower than the first conveyance speed.

5. The image forming apparatus according to claim 1, further comprising a sheet guide path that is configured to guide the sheet discharged by the discharging portion toward the image reading portion and whose length from the discharging portion to the image reading portion is longer than a length of a sheet of a maximum usable size in a conveyance direction of the sheet.

6. The image forming apparatus according to claim 1, further comprising:
a movable guide portion disposed between the discharging portion and the image reading portion and configured to accommodate the sheet discharged by the discharging portion,
wherein the control portion is configured to drive the discharging portion such that a leading end of the sheet in a conveyance direction of the sheet abuts the conveyance portion that is stopped and a part of a loop of the sheet projects from the movable guide portion in a period before a trailing end of the sheet is released from the discharging portion in the conveyance direction of the sheet, and to drive the conveyance portion such that the sheet is conveyed from the movable guide portion toward the image reading portion in a period after the trailing end of the sheet in the conveyance direction of the sheet is released from the discharging portion.

7. The image forming apparatus according to claim 1, wherein the discharging portion also functions as an inversion re-conveyance portion configured to invert the sheet such that a leading end of the sheet and a trailing end of the sheet are interchanged and to convey the sheet to the image forming unit again to form an image on a second surface of the sheet on a first surface of which an image has been formed by the image forming unit.

* * * * *